(12) United States Patent
Tucker

(10) Patent No.: US 9,546,087 B1
(45) Date of Patent: Jan. 17, 2017

(54) APPARATUSES AND METHODS FOR CONNECTING TO OBJECTS OF DIFFERENT SIZES

(71) Applicant: ONEFIFTY LABS INC., Edmonton (CA)

(72) Inventor: Ryan Thomas Tucker, Edmonton (CA)

(73) Assignee: ONE FIFTY LABS INC., Edmonton, AB (CA)

( * ) Notice: Subject to any disclaimer, the term of this patent is extended or adjusted under 35 U.S.C. 154(b) by 0 days.

(21) Appl. No.: 14/795,827

(22) Filed: Jul. 9, 2015

(51) Int. Cl.
*F16B 5/07* (2006.01)
*B67D 7/32* (2010.01)

(52) U.S. Cl.
CPC ............... *B67D 7/3209* (2013.01); *F16B 5/07* (2013.01); *Y10T 137/5762* (2015.04)

(58) Field of Classification Search
CPC ............ B67D 7/3209; F16B 5/07; F16B 5/00; Y10T 137/5762
USPC .................................................. 137/312, 313
See application file for complete search history.

(56) References Cited

U.S. PATENT DOCUMENTS

| | | |
|---|---|---|
| 441,141 A | 11/1890 | Dalton |
| 3,854,684 A | 12/1974 | Moore |
| 4,717,036 A | 1/1988 | Dundas et al. |
| 5,058,633 A | 10/1991 | Sharp |
| 5,134,878 A | 8/1992 | Sharp |
| 5,313,991 A | 5/1994 | Murray et al. |
| 5,361,931 A | 11/1994 | VanLandingham |
| 5,647,412 A | 7/1997 | Brewer |
| 5,687,757 A | 11/1997 | Heintz et al. |
| 5,687,871 A * | 11/1997 | Pettesch ............... B67D 7/3209 220/4.12 |
| 5,960,826 A | 10/1999 | Hebblethwaite et al. |

(Continued)

FOREIGN PATENT DOCUMENTS

| | | |
|---|---|---|
| CA | 2196842 A1 | 8/1997 |
| CA | 2159254 C | 12/1997 |

(Continued)

OTHER PUBLICATIONS

Photograph of SecureFlow™ spill containment product, downloaded from http://www.nnetalboss.com/products/secure-flow/on Nov. 25, 2015.

(Continued)

*Primary Examiner* — Kevin Lee

(57) ABSTRACT

According to one embodiment, an apparatus, connectable to objects of different sizes, comprises: a first connection body comprising a first plurality of spaced-apart connectors and a second plurality of spaced-apart connectors; and a second connection body comprising a first connector and a second connector, the first connector connectable to and disconnectable from a first one of the first plurality of spaced-apart connectors, and the second connector connectable to and disconnectable from a first one of the second plurality of spaced-apart connectors. When the first connector is connected to the first one of the first plurality of spaced-apart connectors and when the second connector is connected to the first one of the second plurality of spaced-apart connectors, the first connection body and the second connection body define a region having a first size between the first connection body and the second connection body. Methods are also disclosed.

20 Claims, 7 Drawing Sheets

(56) References Cited

U.S. PATENT DOCUMENTS

| | | | |
|---|---|---|---|
| 6,238,137 | B1 | 5/2001 | Whitworth et al. |
| 6,354,340 | B1* | 3/2002 | Craine et al. ........ B67D 7/3209 |
| | | | 137/312 |
| 7,165,572 | B2 | 1/2007 | Hebblethwaite |
| 7,318,446 | B1 | 1/2008 | Tarver |
| 7,673,658 | B1 | 3/2010 | Brewer et al. |
| 7,921,884 | B2 | 4/2011 | Brewer et al. |
| 7,931,242 | B2 | 4/2011 | Tjerrild |
| 7,967,164 | B1 | 6/2011 | Mountain |
| 8,622,092 | B1 | 1/2014 | Condon et al. |
| 8,631,815 | B2 | 1/2014 | VanConett |
| 8,684,024 | B2 | 4/2014 | Kuehn |
| 9,151,428 | B2 | 10/2015 | Brewer et al. |
| 2003/0047238 | A1 | 3/2003 | Prymych |
| 2008/0023075 | A1 | 1/2008 | Bravo et al. |
| 2013/0160860 | A1 | 6/2013 | King |
| 2014/0130897 | A1* | 5/2014 | Vanconett ............... F04B 17/06 |
| | | | 137/312 |

FOREIGN PATENT DOCUMENTS

| | | |
|---|---|---|
| CA | 2553356 A1 | 1/2007 |
| EP | 2311774 A2 | 4/2011 |

OTHER PUBLICATIONS

Photographs of Pollution Control Corp load line container, downloaded from http://www.pollutioncontrolcorp.com/Tekpac/LoadLine.html on Nov. 25, 2015.

* cited by examiner

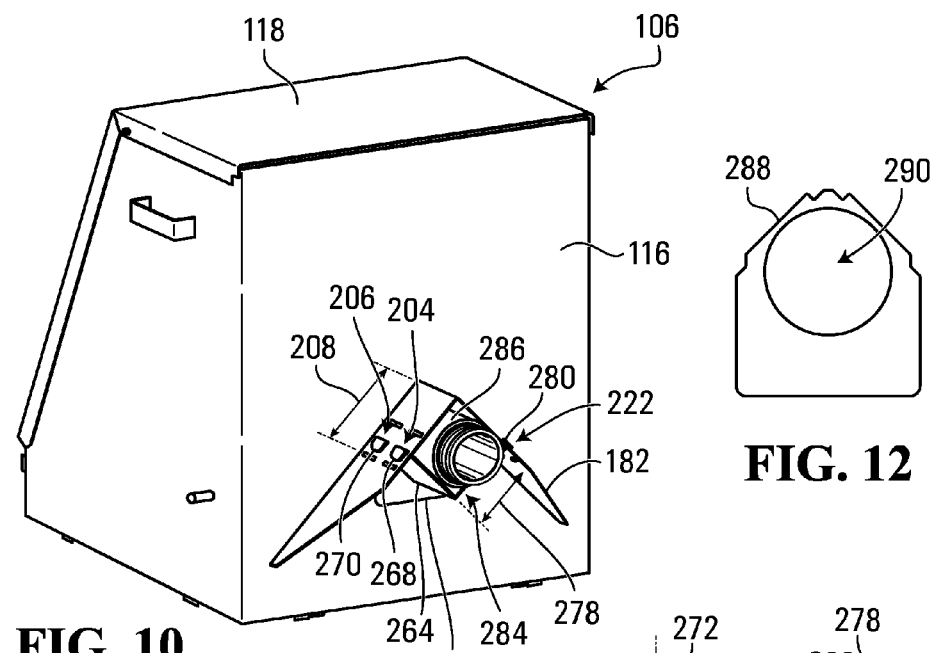
FIG. 10
FIG. 12
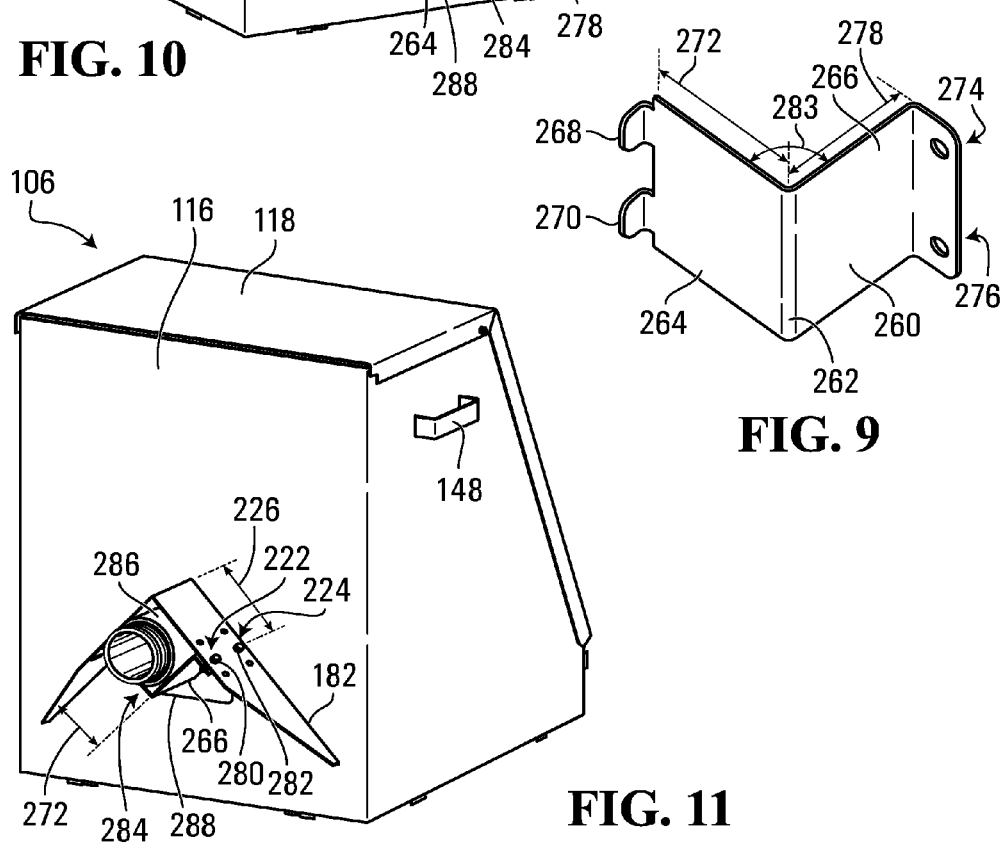
FIG. 9
FIG. 11

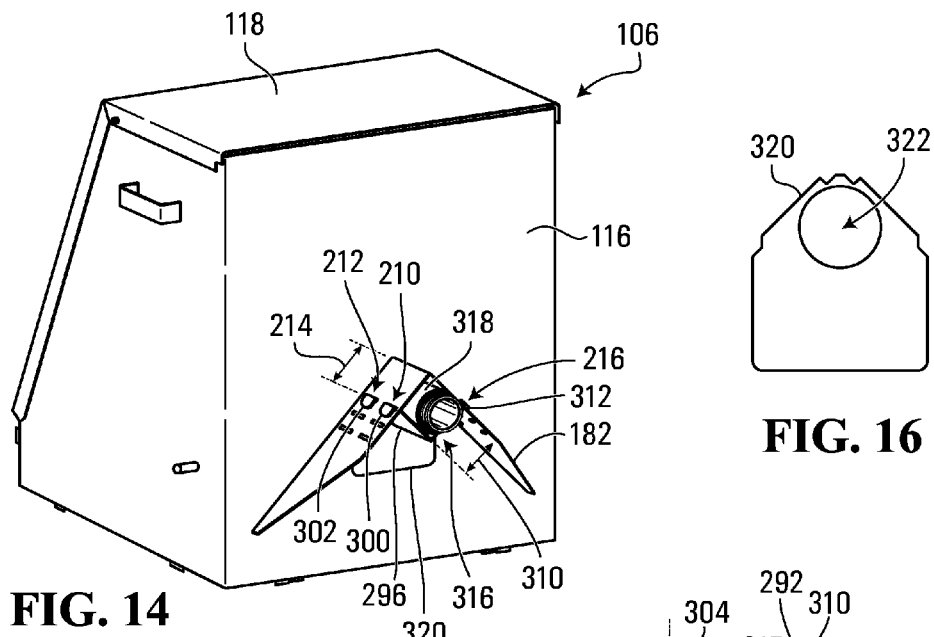
FIG. 14
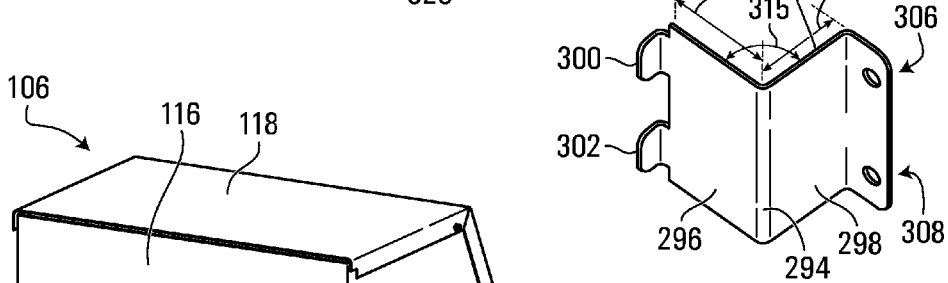
FIG. 16
FIG. 13
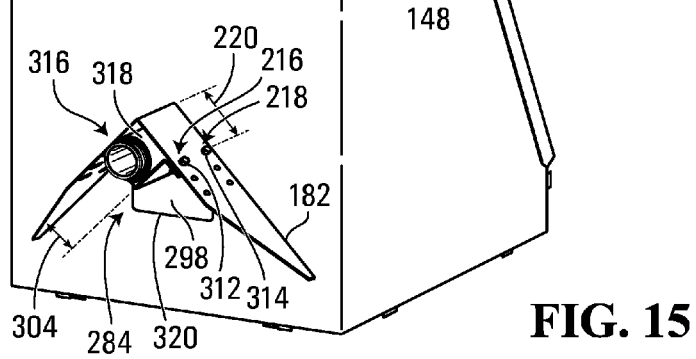
FIG. 15

APPARATUSES AND METHODS FOR CONNECTING TO OBJECTS OF DIFFERENT SIZES

FIELD

This disclosure relates generally to connecting to objects of different sizes.

RELATED ART

Spill containers may be positioned to contain spills, for example at connection and disconnection points in fluid transfer systems. For example, one load line spill container receives fluid from a fluid container at a rear side of the spill container, and contains a connection and disconnection point for a fluid transfer destination such as a tank truck. However, such spill containers may not accommodate different sizes of pipes or pipe nipples that receive fluid from the fluid container. Other load line spill containers may accommodate different sizes of pipe nipples but require welding a particular pipe nipple to the spill containers, which may effectively limit such spill containers to particular sizes of pipes and pipe nipples, and which may effectively require manufacturing and assembling different spill containers for different sizes of pipes and pipe nipples.

SUMMARY

According to one embodiment, there is disclosed an apparatus connectable to objects of different sizes, the apparatus comprising: a first connection body comprising a first plurality of spaced-apart connectors and a second plurality of spaced-apart connectors spaced apart from the first plurality of spaced-apart connectors; and a second connection body comprising a first connector and a second connector spaced apart from the first connector of the second connection body, the first connector connectable to and disconnectable from a first one of the first plurality of spaced-apart connectors, and the second connector connectable to and disconnectable from a first one of the second plurality of spaced-apart connectors, wherein when the first connector is connected to the first one of the first plurality of spaced-apart connectors and when the second connector is connected to the first one of the second plurality of spaced-apart connectors, the first connection body and the second connection body define a region having a first size between the first connection body and the second connection body.

In some embodiments, the apparatus further comprises a first cover body defining an opening sized to receive an object sized to be clamped in the first region.

In some embodiments, the first size of the region is sized to clamp a generally cylindrical object having a first diameter.

In some embodiments, the first plurality of spaced-apart connectors are spaced apart from each other in a first plane.

In some embodiments, the second plurality of spaced-apart connectors are spaced apart from each other in a second plane extending non-parallel to the first plane.

In some embodiments, the second plane extends generally perpendicular to the first plane.

In some embodiments, the apparatus further comprises a third connection body comprising a third connector and a fourth connector spaced apart from the third connector of the third connection body, the third connector connectable to and disconnectable from a second one of the first plurality of spaced-apart connectors different from the first one of the first plurality of spaced-apart connectors, and the fourth connector connectable to and disconnectable from a second one of the second plurality of spaced-apart connectors different from the first one of the second plurality of spaced-apart connectors, wherein when the third connector is connected to the second one of the first plurality of spaced-apart connectors and when the fourth connector is connected to the second one of the second plurality of spaced-apart connectors, the first connection body and the third connection body are positioned to define a region having a second size, different from the first size, between the first connection body and the third connection body.

In some embodiments, the first and second connectors are spaced apart from each other by a first separation distance and the third and fourth connectors are spaced apart from each other by a second separation distance different from the first separation distance.

In some embodiments, the apparatus further comprises a second cover body defining an opening sized to receive an object sized to be clamped in the second region.

In some embodiments, the second size of the region is sized to clamp a generally cylindrical object having a second diameter.

In some embodiments, the apparatus further comprises a fourth connection body comprising a fifth connector and a sixth connector spaced apart from the fifth connector of the fourth connection body, the fifth connector connectable to and disconnectable from a third one of the first plurality of spaced-apart connectors different from the first and second ones of the first plurality of spaced-apart connectors, and the sixth connector connectable to and disconnectable from a third one of the second plurality of spaced-apart connectors different from the first and second ones of the second plurality of spaced-apart connectors, wherein when the fifth connector is connected to the third one of the first plurality of spaced-apart connectors and when the sixth connector is connected to the third one of the second plurality of spaced-apart connectors, the first connection body and the fourth connection body are positioned to define a region having a third size, different from the first and second sizes, between the first connection body and the fourth connection body.

According to another embodiment, there is disclosed a spill container comprising a container body and the apparatus connected to the container body.

In some embodiments, the spill container further comprises a pipe or a pipe nipple connected to the apparatus.

According to another embodiment, there is disclosed a method of connecting a first connection body and a second connection body to an object, the method comprising: connecting a first connector of the second connection body to one of a first plurality of spaced-apart connectors on the first connection body; and connecting a second connector of the second connection body, spaced apart from the first connector of the second connection body, to one of a second plurality of spaced-apart connectors on the first connection body and spaced apart from the first plurality of spaced-apart connectors, wherein connecting the second connector of the second connection body to the one of the second plurality of spaced-apart connectors on the first connection body comprises defining a region between the first connection body and the second connection body to receive the object.

In some embodiments, defining the region between the first connection body and the second connection body comprises clamping the object between the first connection body and the second connection body.

In some embodiments, the object comprises a pipe or a pipe nipple.

In some embodiments, defining the region between the first connection body and the second connection body comprises connecting the object to a spill container.

In some embodiments, the first plurality of spaced-apart connectors are spaced apart from each other in a first plane.

In some embodiments, the second plurality of spaced-apart connectors are spaced apart from each other in a second plane extending non-parallel to the first plane.

In some embodiments, the second plane extends generally perpendicular to the first plane.

Other aspects and features will become apparent to those ordinarily skilled in the art upon review of the following description of illustrative embodiments in conjunction with the accompanying figures.

BRIEF DESCRIPTION OF THE DRAWINGS

FIG. 9 is a perspective view of a third connection body that may be connected to the first connection body of FIG. 4.

FIG. 10 is a rear perspective view of the spill container of the fluid transfer system of FIG. 1 with the first connection body of FIG. 4 connected to the rear side of the spill container and with the third connection body of FIG. 9 connected to the first connection body.

FIG. 11 is another rear perspective view of the spill container of the fluid transfer system of FIG. 1 with the first connection body of FIG. 4 connected to the rear side of the spill container and with the third connection body of FIG. 9 connected to the first connection body.

FIG. 12 is a front view of a first cover body that may be positioned against the rear side of the spill container of the fluid transfer system of FIG. 1.

FIG. 13 is a perspective view of a fourth connection body that may be connected to the first connection body of FIG. 4.

FIG. 14 is a rear perspective view of the spill container of the fluid transfer system of FIG. 1 with the first connection body of FIG. 4 connected to the rear side of the spill container and with the fourth connection body of FIG. 13 connected to the first connection body.

FIG. 15 is another rear perspective view of the spill container of the fluid transfer system of FIG. 1 with the first connection body of FIG. 4 connected to the rear side of the spill container and with the fourth connection body of FIG. 13 connected to the first connection body.

FIG. 16 is a front view of a second cover body that may be positioned against the rear side of the spill container of the fluid transfer system of FIG. 1.

DETAILED DESCRIPTION

Figure 1:
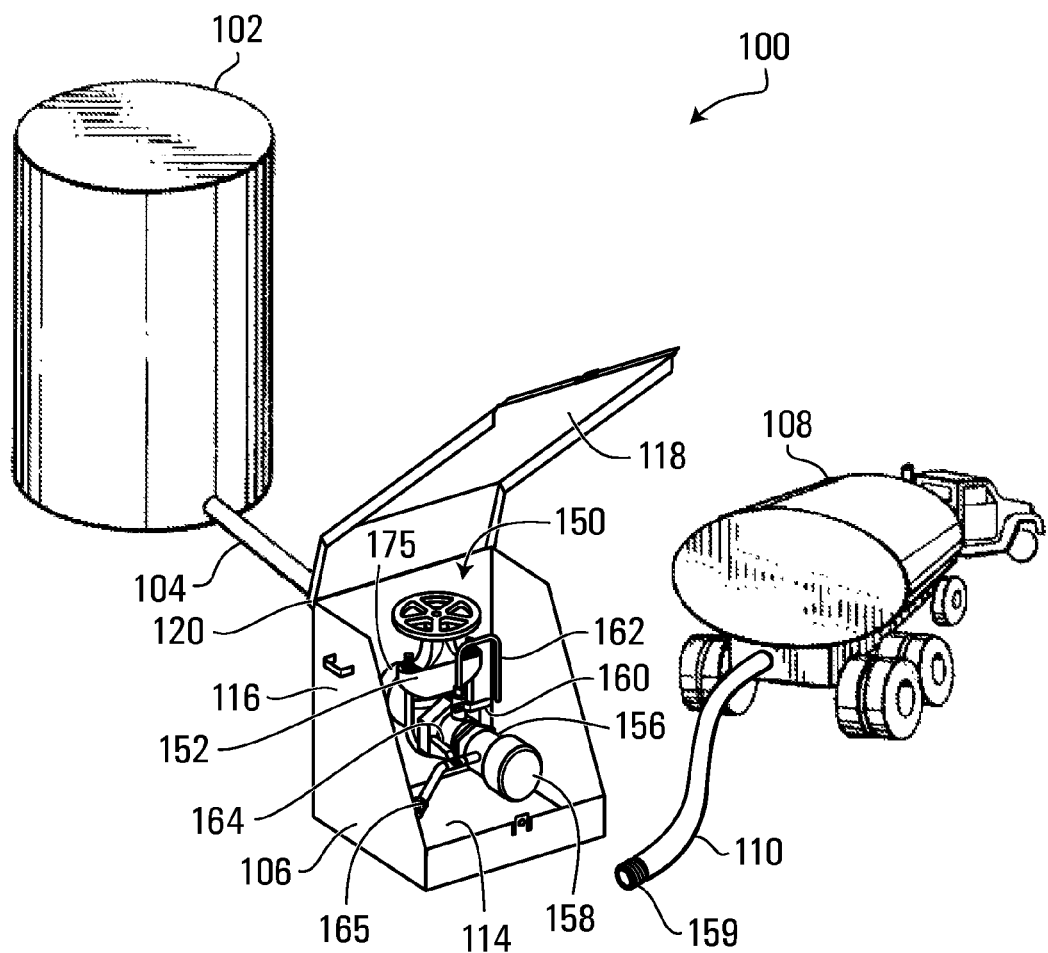
FIG. 1 is a perspective view of a fluid transfer system according to one embodiment.
Figure 2:
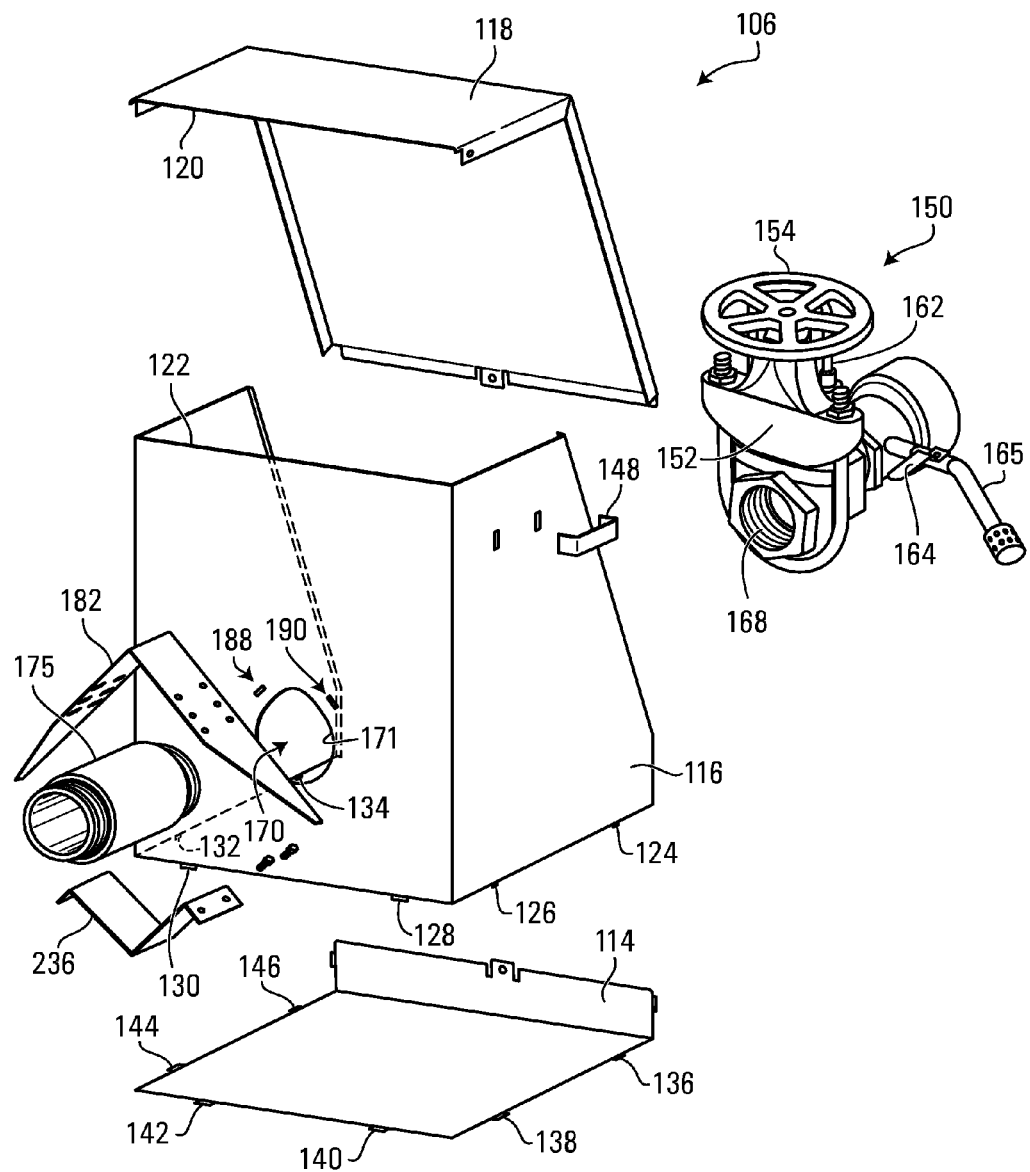
FIG. 2 is an exploded perspective view of some components of the fluid transfer system of FIG. 1.

Referring to FIGS. 1 and 2, a fluid transfer system according to one embodiment is shown generally at 100 and includes a fluid container 102, a fluid outlet conduit 104 for transporting fluid (not shown) out of the fluid container 102, a load line spill container 106 positioned to receive fluid from the fluid outlet conduit 104, and a fluid transfer destination, which in the embodiment shown is tank truck 108 including a fluid conduit 110 for receiving fluid from the fluid container 102 through the fluid outlet conduit 104 and the spill container 106 as described below. In alternative embodiments, the fluid transfer destination may be a train car, a boat, or another mobile fluid container, for example. The spill container 106 includes a bottom body 114, a side body 116, and a top body 118. The bottom body 114, the side body 116, and the top body 118 collectively define a container body and may be manufactured from sheet metal, and may include one or more of mild steel, stainless steel, aluminum, or other metallic materials, or non-metallic materials such as plastic or fiberglass, for example.

FIG. 2 illustrates the bottom body 114, the side body 116, and the top body 118 positioned for assembly into the spill container 106. In the embodiment shown, a rear edge 120 of the top body 118 may be coupled by a hinge (not shown) to an upper rear edge 122 of the side body 116. Further, alignment projections 124, 126, 128, 130, 132, and 134 on bottom edges of the side body 116 may be positioned against alignment projections 136, 138, 140, 142, 144, and 146 respectively on side edges of the bottom body 114 to align the bottom body 114 relative to the side body 116 before connecting the bottom body 114 to the side body 116 by welding, for example. In general, such alignment tabs may increase speed, efficiency, precision, and reliability during assembly of the spill container 106 in some embodiments, such as embodiments involving automated assembly for example. Further, a handle 148 may be connected to the side body 116 by welding or bolting, for example.

Still referring to FIGS. 1 and 2, the spill container 106 may be assembled with a valve assembly shown generally at 150 inside the spill container 106 and including a valve housing 152 enclosing a valve (such as a gate valve or ball valve, for example, not shown) that may be opened or closed using a valve handle 154 to allow for control over the flow of fluid from the fluid container 102 to the tank truck 108 or other fluid transfer destination. On a front side of the valve assembly 150, a fluid outlet conduit 156 terminates at a pipe coupling 158 that may be coupled to a pipe coupling 159 on the fluid conduit 110. The fluid outlet conduit 156 is also coupled to an evacuation valve 160 that may be opened to evacuate the fluid outlet conduit 156 through an evacuation pipe 162. The fluid outlet conduit 156 is also coupled to an inlet valve 164 that may be opened to receive fluid, from a fluid containment region capable of holding liquid at the bottom of the spill container 106, through a fluid inlet conduit 165 using suction.

On a rear side, the valve housing 152 defines internal threads 168 that may be coupled to external threads on a first end of a generally cylindrical pipe nipple 175. External threads on a second end (opposite the first end) of the pipe nipple 175 may be coupled to the fluid outlet conduit 104 to receive fluid from the fluid container 102 through the fluid outlet conduit 104, through the pipe nipple 175, through the valve assembly 150, through the fluid outlet conduit 156, and through the fluid conduit 110 into the tank truck 108 or other fluid transfer destination. The side body 116 defines a through-opening shown generally at 170 and sized to receive the pipe nipple 175 from the rear side of the spill container 106 to allow the pipe nipple 175 to be connected to the internal threads 168 of the valve housing 152 inside the spill container 106. Therefore, when the pipe nipple 175 is received in the through-opening 170, and when the pipe nipple 175 connects the fluid outlet conduit 104 to the valve housing 152, the pipe nipple 175 forms part of the overall fluid conduit from the fluid container 102 to the tank truck 108 or other fluid transfer destination. However, in alternative embodiments, the pipe nipple 175 may be omitted, and instead the fluid outlet conduit 104 may be received through the through-opening 170 and connected directly or otherwise to the valve housing 152, for example.

The embodiment shown in FIGS. 1 and 2 is an example only, and spill containers of alternative embodiments may include other components such as other valve assemblies or other connection-point components, for example. In general, the spill container 106 may in some embodiments provide some degree of security for the valve assembly 150 and other components inside the spill container 106. Further, in some embodiments, the spill container 106 may contain connection and disconnection points for the fluid transfer system 100, and the fluid containment region may collect and contain drips or spills of liquid that may occur inside the spill container 106 to prevent harmful or wasteful leaks, spills, or other material loss.

Figure 3:
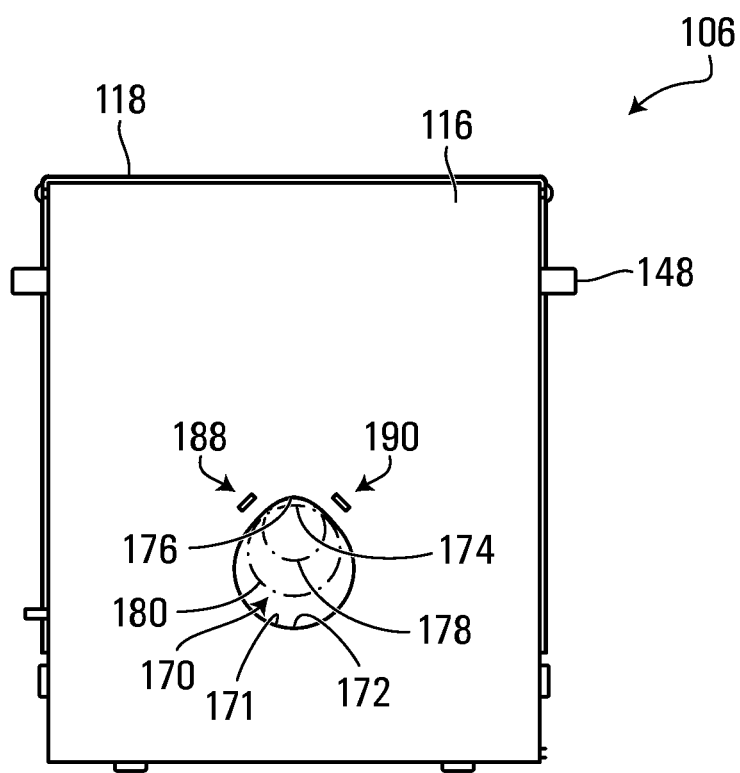
FIG. 3 is a rear view of a load line spill container of the fluid transfer system of FIG. 1.

Referring to FIGS. 2 and 3, the through-opening 170 is surrounded by a curved inner surface 171 including a lower curved surface portion 172 having a curvature of a circle 174 having a diameter of about 4.5 inches or about 11.5 cm. The curved inner surface 171 also includes an upper curved surface portion 176 having a curvature of a circle 178 having a diameter of about 2.375 inches or about 6 cm. Therefore, pipes, pipe nipples, or other conduits or objects having diameters up to the diameter of the circle 174 may be received through the through-opening 170 and may contact a portion of the curved inner surface 171. For example, the pipe nipple 175 has a diameter of the circle 174 and may be received through the through-opening 170 and contact the lower curved surface portion 172. Further, a pipe, pipe nipple, or other conduit or object having a diameter of the circle 178 may be received through the through-opening 170 and contact the upper curved surface portion 176, and pipes, pipe nipples, or other conduits or objects having different diameters may also be received through the through-opening 170 and contact a portion of the curved inner surface 171. For example, in the embodiment shown, a circle 180 has a diameter of about 3.5 inches or about 8.9 cm, and a pipe, pipe nipple, or other conduit or object having a diameter of the circle 180 may also be received through the through-opening 170 and contact a portion of the curved inner surface 171. In general, in various different embodiments, the lower curved surface portion 172 may have a curvature similar to a curvature of an outer surface of a largest object to be received through to the through-opening 170, the upper curved surface portion 176 may have a curvature similar to a curvature of an outer surface of a smallest object to be received through to the through-opening 170. Further, generally straight surface portions of the curved inner surface 171 may extend between the lower curved surface portion 172 and the upper curved surface portion 176 along tangent lines of the circle 174 and of the circle 178, and such generally straight surface portions of the curved inner surface 171 may extend relative to each other at an angle similar to the angle 234 (shown in FIG. 5 and described below), for example.

Figure 4:
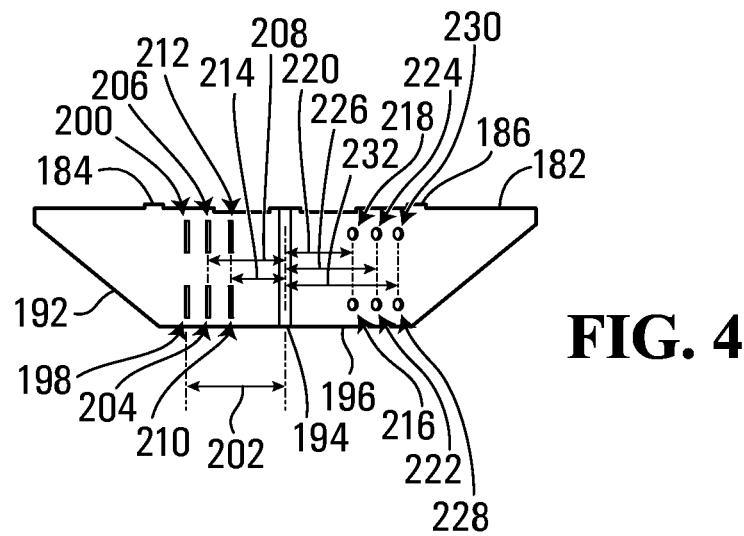
FIG. 4 is a top view of a first connection body that may be connected to the spill container of the fluid transfer system of FIG. 1.
Figure 5:
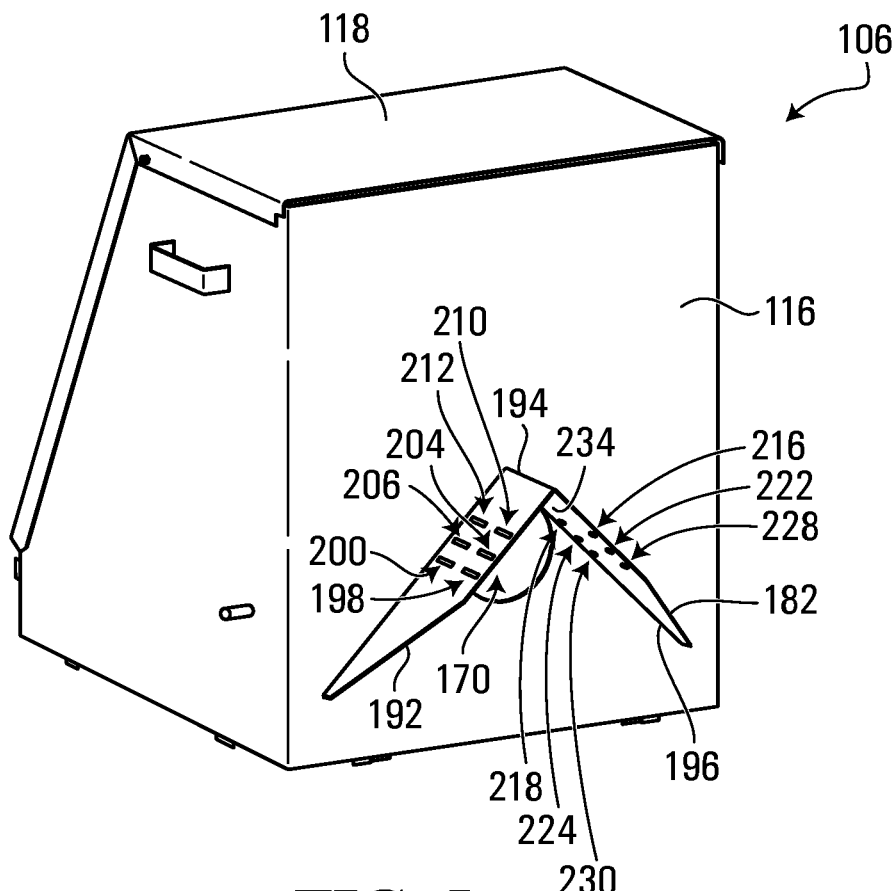
FIG. 5 is a rear perspective view of spill container of the fluid transfer system of FIG. 1 with the first connection body of FIG. 4 connected to the rear side of the spill container.

Referring to FIGS. 3 to 5, a first connection body 182 includes projections 184 and 186 sized to be received in respective complementary openings shown generally at 188 and 190 in the rear side of the side body 116 to facilitate aligning the first connection body 182 to the side body 116 of the spill container 106, and the first connection body 182 may be connected to the rear side of the side body 116 of the spill container 106 by welding, bolting, or affixing with an adhesive, for example. The first connection body 182 includes a first generally planar lateral portion 192 extending laterally away in one direction from a central portion 194 of the first connection body 182, and the first connection body 182 also includes a second generally planar lateral portion 196 extending laterally away in another direction (opposite the first direction) from the central portion 194, and those directions are non-parallel so the first connection body 182 is generally "v-shaped". When the connection body 182 is connected to the rear side of the side body 116 as shown, the connection body 182 may strengthen the rear side of the side body 116 and may also function as part of a clamp (or more generally, as part of an apparatus connectable to objects of different sizes) as described below.

The first lateral portion 192 defines through-openings shown generally at 198 and 200 (which are a common distance 202 from the central portion 194 and collectively define a connector), through-openings shown generally at 204 and 206 (which are a common distance 208 from the central portion 194 and collectively define a connector), and through-openings 210 and 212 (which are a common distance 214 from the central portion 194 and collectively define a connector). Therefore, the first lateral portion 192 of the first connection body 182 defines a first plurality of connectors (namely the connector defined by the through-openings 198 and 200, the connector defined by the through-openings 204 and 206, and the connector defined by the through-openings 210 and 212) that are spaced apart from each other in a direction along the first lateral portion 192. Although the first lateral portion 192 in the embodiment shown includes three connectors, each defined by two through-openings, alternative embodiments may include more or fewer connectors, and connectors in alternative embodiments may differ from the embodiment shown. For example, connectors in alternative embodiments of the first lateral portion 192 may be defined by a different number of through-openings, or may include fasteners or other different connection structures.

Likewise, the second lateral portion 196 defines through-openings shown generally at 216 and 218 (which are a common distance 220 from the central portion 194 and collectively define a connector), through-openings shown generally at 222 and 224 (which are a common distance 226 from the central portion 194 and collectively define a connector), and through-openings shown generally at 228 and 230 (which are a common distance 232 from the central portion 194 and collectively define a connector). Therefore, the second lateral portion 196 of the first connection body 182 defines a second plurality of connectors (namely the connector defined by the through-openings 216 and 218, the connector defined by the through-openings 222 and 224, and the connector defined by the through-openings 228 and 230) that are spaced apart from each other in a direction along the second lateral portion 196. Although the second lateral portion 196 in the embodiment shown includes three connectors, each defined by two through-openings, alternative embodiments may include more or fewer connectors, and connectors in alternative embodiments may differ from the embodiment shown. For example, connectors in alternative embodiments of the second lateral portion 196 may be defined by a different number of through-openings, or may include fasteners or other different connection structures.

As shown in FIG. 5, the aforementioned connectors on the first lateral portion 192 are in a common plane defined by the first lateral portion 192 and extending down and laterally away in one direction from the central portion 194, and the aforementioned connectors on the second lateral portion 196 are in a different common plane defined by the second lateral portion 196 and extending down and laterally away in another direction (opposite the first direction) from the central portion 194 such that the common plane of the connectors on the first lateral portion 192 is not parallel to the common plane of the connectors on the second lateral portion 196. In other words, in the embodiment shown, the common plane of the connectors on the first lateral portion 192 extends at an angle 234 from the common plane of the connectors on the second lateral portion 196. The angle 234 in the embodiment shown is about 90 degrees, so the common plane of the connectors on the first lateral portion 192 extends generally perpendicular to the common plane of the connectors on the second lateral portion 196. In this context, "generally perpendicular" refers to planes that may not be perfectly perpendicular, but that may function substantially similar to perpendicular planes. More generally, "generally" herein contemplates variations that may or may not be described herein and that may function substantially similar to those described herein. However, in alternative embodiments, the angle 234 may be larger or smaller than 90 degrees.

Figure 6:
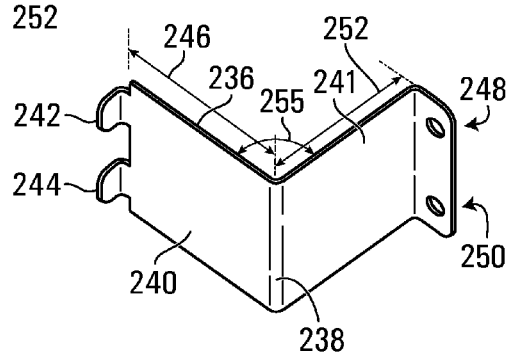
FIG. 6 is a perspective view of a second connection body that may be connected to the first connection body of FIG. 4.

Referring to FIG. 6, a second connection body 236 includes a central portion 238, a first lateral portion 240 on one side of the central portion 238, and a second lateral portion 241 on the other side of the central portion 238 opposite the first lateral portion 240. The first lateral portion 240 includes projections 242 and 244, which are a common distance 246 from the central portion 238, and which collectively define a connector that is connectable to the connector defined by the through-openings 198 and 200 by positioning the projections 242 and 244 through the through-openings 198 and 200 respectively, and that is disconnectable from the connector defined by the through-openings 198 and 200 by removing the projections 242 and 244 from the through-openings 198 and 200 respectively. Although the connector on the first lateral portion 240 in the embodiment shown is defined by the projections 242 and 244, connectors in alternative embodiments of the first lateral portion 240 may be defined by a different number of projections, or may include fasteners or other different connection structures.

Figure 7:
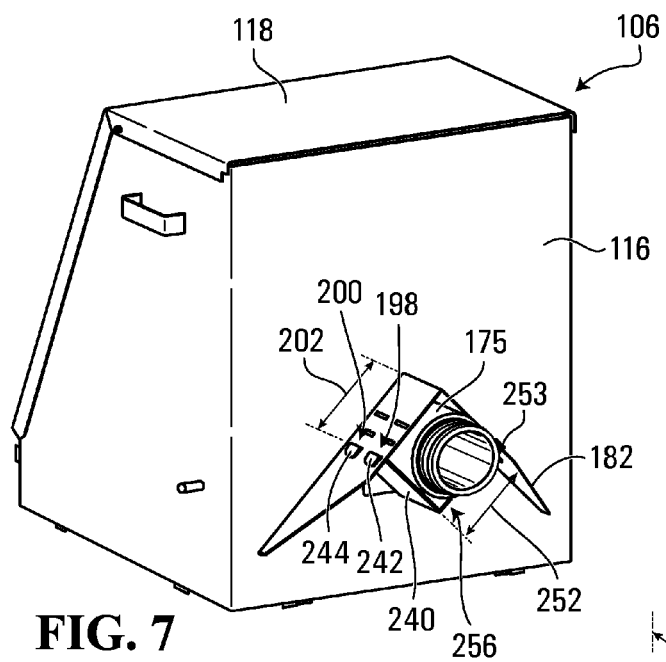
FIG. 7 is a rear perspective view of the spill container of the fluid transfer system of FIG. 1 with the first connection body of FIG. 4 connected to the rear side of the spill container and with the second connection body of FIG. 6 connected to the first connection body.
Figure 8:
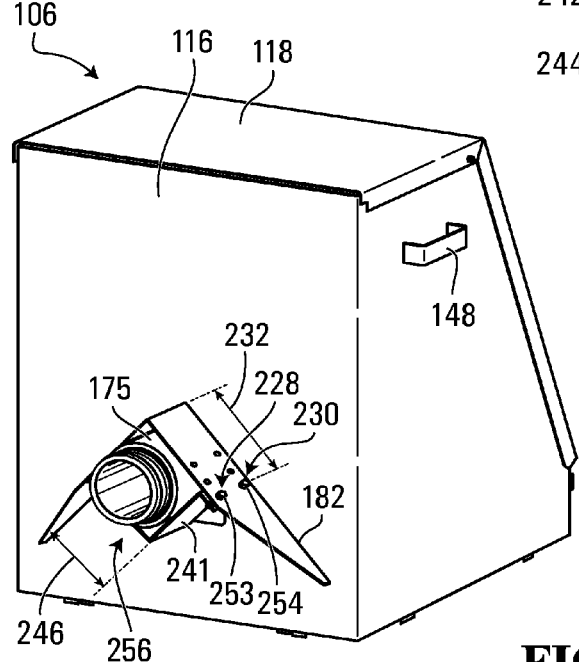
FIG. 8 is another rear perspective view of the spill container of the fluid transfer system of FIG. 1 with the first connection body of FIG. 4 connected to the rear side of the spill container and with the second connection body of FIG. 6 connected to the first connection body.

On the second lateral portion 241, the second connection body 236 defines through-openings shown generally at 248 and 250, which are a common distance 252 from the central portion 238, and which collectively define a connector that is connectable to the connector defined by the through-openings 228 and 230, using connecters such as a bolt 253 through the through-openings 248 and 228 and a bolt 254 through the through-openings 250 and 230 for example, when the connector defined by the projections 242 and 244 is connected to the connector defined by the through-openings 198 and 200, as shown in FIGS. 7 and 8, and that is disconnectable from the connector defined by the through-openings 228 and 230 by removing the bolts 253 and 254. Although the connector on the second lateral portion 241 in the embodiment shown is defined by the through-openings 248 and 250, connectors in alternative embodiments of the second lateral portion 241 may be defined by a different number of through-openings, or may include fasteners or other different connection structures. The first lateral portion 240 extends non-parallel (and at a 90-degree angle 255 in the embodiment shown) from the second lateral portion 241, so the second connection body 236 is generally "v-shaped".

When the connector defined by the projections 242 and 244 is connected to the connector defined by the through-openings 198 and 200, and when the connector defined by defined by the through-openings 248 and 250 is connected to the connector defined by the through-openings 228 and 230, the first connection body 182 and the second connection body 236 define a region shown generally at 256 adjacent the through-opening 170 (shown in FIG. 3). The region 256 is generally square with sides defined by the distances 202, 232, 246, and 252, which are about 4.5 inches or about 11.5 cm, and therefore about equal to the diameter of the circle 174 (also shown in FIG. 3), except that the distance 232 is slightly larger than the distances 202, 246, and 252 because, as shown in FIGS. 6 and 8, the through-openings 228, 230, 248, and 250 are spaced apart from the surface of the second lateral portion 241 that defines the region 256. As shown in FIGS. 7 and 8, the pipe nipple 175, which has a diameter of about 4.5 inches or about 11.5 cm, may thus be clamped or otherwise connected to the first connection body 182 and the second connection body 236 in the region 256 between the first connection body 182 and the second connection body 236, and an outer surface of the pipe nipple 175 may contact the lower curved surface portion 172 (also shown in FIG. 3) as described above.

In some embodiments, a pipe-connected object (such as the valve assembly 150, for example) may be too large in at least one dimension to rotate inside the spill container 106, and in such embodiments connecting the pipe-connected object to the spill container 106 by threading may be impractical or impossible because such threading may require rotating the pipe-connected object inside the spill container 106. However, once an object such as the pipe nipple 175 is connected to the pipe-connected object, the pipe-connected object may be connected to the spill container 106 by connecting or clamping the pipe nipple 175 (or other object) to connection bodies as described herein without requiring rotation the pipe-connected object inside the spill container 106.

Different pipes, pipe nipples, and other conduits and objects may have diameters that differ from the diameter of the pipe nipple 175, and such different pipes, pipe nipples, and other conduits and objects may also be connected or clamped as described below for example.

Referring to FIG. 9, a third connection body 260 includes a central portion 262, a first lateral portion 264 on one side of the central portion 262, and a second lateral portion 266 on the other side of the central portion 262 opposite the first lateral portion 264. The first lateral portion 264 includes projections 268 and 270, which are a common distance 272 from the central portion 262, and which collectively define a connector that is connectable to the connector defined by the through-openings 204 and 206 by positioning the projections 268 and 270 through the through-openings 204 and 206 respectively, and that is disconnectable from the connector defined by the through-openings 204 and 206 by removing the projections 268 and 270 from the through-openings 204 and 206 respectively. Although the connector on the first lateral portion 264 in the embodiment shown is defined by the projections 268 and 270, connectors in alternative embodiments of the first lateral portion 264 may be defined by a different number of projections, or may include fasteners or other different connection structures.

On the second lateral portion 266, the third connection body 260 defines through-openings shown generally at 274 and 276, which are a common distance 278 from the central portion 262, and which collectively define a connector that is connectable to the connector defined by the through-openings 222 and 224, using connecters such as a bolt 280 through the through-openings 274 and 222 and a bolt 282 through the through-openings 276 and 224 for example, when the connector defined by the projections 268 and 270 is connected to the connector defined by the through-openings 204 and 206, as shown in FIGS. 10 and 11, and that is disconnectable from the connector defined by the through-openings 222 and 224 by removing the bolts 280 and 282. Although the connector on the second lateral portion 266 in the embodiment shown is defined by the through-openings 274 and 276, connectors in alternative embodiments of the second lateral portion 266 may be defined by a different number of through-openings, or may include fasteners or other different connection structures. The first lateral portion 264 extends non-parallel (and at a 90-degree angle 283 in the embodiment shown) from the second lateral portion 266, so the third connection body 260 is generally "v-shaped".

When the connector defined by the projections 268 and 270 is connected to the connector defined by the through-openings 204 and 206, and when the connector defined by defined by the through-openings 274 and 276 is connected to the connector defined by the through-openings 222 and 224, the first connection body 182 and the third connection body 260 define a region shown generally at 284 adjacent the through-opening 170 (shown in FIG. 3). The region 284 is generally square with sides defined by the distances 208, 226, 272, and 278, which are about 3.5 inches or about 8.9 cm, and therefore about equal to the diameter of the circle 180 (also shown in FIG. 3), except that the distance 226 is slightly larger than the distances 208, 272, and 278 because, as shown in FIGS. 9 and 11, the through-openings 222, 224, 274, and 276 are spaced apart from the surface of the second lateral portion 266 that defines the region 284. As shown in FIGS. 10 and 11, a generally cylindrical pipe nipple 286 having a diameter of about 3.5 inches or about 8.9 cm may thus be clamped or otherwise connected to the first connection body 182 and the third connection body 260 in the region 284 between the first connection body 182 and the third connection body 260, and an outer surface of the pipe nipple 286 may contact a portion of the curved inner surface 171 (also shown in FIG. 3) as described above.

Referring to FIG. 12, a first cover body 288 defines a through-opening shown generally at 290 and also having a diameter of about 3.5 inches or about 8.9 cm to receive the pipe nipple 286. Because the diameter of the pipe nipple 286 is smaller than the diameter of the circle 174 (shown in FIG. 3), the first cover body 288 may be positioned as shown in FIGS. 10 and 11 against the rear side of the side body 116 with the through-opening 290 adjacent the through-opening 170 (also shown in FIG. 3) so that the through-opening 290 and the through-opening 170 receive the pipe nipple 286 and the first cover body 288 covers at least a portion of the through-opening 170 that is not occupied by the pipe nipple 286.

Referring to FIG. 13, a fourth connection body 292 includes a central portion 294, a first lateral portion 296 on one side of the central portion 294, and a second lateral portion 298 on the other side of the central portion 294 opposite the first lateral portion 296. The first lateral portion 296 includes projections 300 and 302, which are a common distance 304 from the central portion 294, and which collectively define a connector that is connectable to the connector defined by the through-openings 210 and 212 by positioning the projections 300 and 302 through the through-openings 210 and 212 respectively, and that is disconnectable from the connector defined by the through-openings 210 and 212 by removing the projections 300 and 302 from the through-openings 210 and 212 respectively. Although the connector on the first lateral portion 296 in the embodiment shown is defined by the projections 300 and 302, connectors in alternative embodiments of the first lateral portion 296 may be defined by a different number of projections, or may include fasteners or other different connection structures.

On the second lateral portion 298, the fourth connection body 292 defines through-openings shown generally at 306 and 308, which are a common distance 310 from the central portion 294, and which collectively define a connector that is connectable to the connector defined by the through-openings 216 and 218, using connecters such as a bolt 312 through the through-openings 306 and 216 and a bolt 314 through the through-openings 308 and 218 for example, when the connector defined by the projections 300 and 302 is connected to the connector defined by the through-openings 210 and 212, as shown in FIGS. 14 and 15, and that is disconnectable from the connector defined by the through-openings 216 and 218 by removing the bolts 312 and 314. Although the connector on the second lateral portion 298 in the embodiment shown is defined by the through-openings 306 and 308, connectors in alternative embodiments of the second lateral portion 298 may be defined by a different number of through-openings, or may include fasteners or other different connection structures. The first lateral portion 296 extends non-parallel (and at a 90-degree angle 315 in the embodiment shown) from the second lateral portion 298, so the fourth connection body 292 is generally "v-shaped".

When the connector defined by the projections 300 and 302 is connected to the connector defined by the through-openings 210 and 212, and when the connector defined by defined by the through-openings 306 and 308 is connected to the connector defined by the through-openings 216 and 218, the first connection body 182 and the fourth connection body 292 define a region shown generally at 316 adjacent the through-opening 170 (shown in FIG. 3). The region 316 is generally square with sides defined by the distances 214, 220, 304, and 310, which are about 2.375 inches or about 6 cm, and therefore about equal to the diameter of the circle 178 (also shown in FIG. 3), except that the distance 220 is slightly larger than the distances 214, 304, and 310 because, as shown in FIGS. 13 and 15, the through-openings 216, 218, 306, and 308 are spaced apart from the surface of the second lateral portion 298 that defines the region 316. As shown in FIGS. 14 and 15, a generally cylindrical pipe nipple 318 having a diameter of about 2.375 inches or about 6 cm may thus be clamped or otherwise connected to the first connection body 182 and the fourth connection body 292 in the region 316 between the first connection body 182 and the fourth connection body 292, and an outer surface of the pipe nipple 318 may contact a portion of the curved inner surface 171 (also shown in FIG. 3) as described above.

Referring to FIG. 16, a second cover body 320 defines a through-opening shown generally at 322 and also having a diameter of about 2.375 inches or about 6 cm to receive the pipe nipple 318. Because the diameter of the pipe nipple 318 is smaller than the diameter of the circle 174 (shown in FIG. 3), the second cover body 320 may be positioned as shown in FIGS. 14 and 15 against the rear side of the side body 116 with the through-opening 322 adjacent the through-opening 170 (also shown in FIG. 3) so that the through-opening 322 and the through-opening 170 receive the pipe nipple 318 and the second cover body 320 covers at least a portion of the through-opening 170 that is not occupied by the pipe nipple 318.

Embodiments such as those described above may facilitate connecting or holding objects (such as pipes or pipe nipples, for example) of different sizes (such as different diameters, for example) to objects (such as the valve assembly 150, for example) in various contexts (such as connection points in fluid transfer systems, for example). In some embodiments, a pipe (or pipe nipple) may support a load line spill container when the pipe (or pipe nipple) and the spill container are connected to connection bodies such as the connection bodies described above. In some other embodiments, a load line spill container may support a pipe (or pipe nipple) when the spill container and the pipe (or pipe nipple) are connected to connection bodies such as the connection bodies described above. Further, although the embodiments described above can hold objects of three different sizes, alternative embodiments may be may hold objects of more or fewer different sizes. In general, the first connection body 182 may have any number of different connectors, and for a given size of an object (such as a given diameter of a pipe, for example), another connection body (such as the second connection body 236, the third connection body 260, or fourth connection body 292 in the embodiment shown, a different connection body in alternative embodiments) may be sized to connect to particular connectors on the first connection body 182 to define a region to clamp or otherwise connect to the object. Therefore, a single size of the spill container 106, for example, may receive fluid from pipes of different sizes, which may avoid a need to weld a pipe or pipe nipple to a spill container and may thus be more versatile and efficient when compared to other load line spill containers, and which may reduce or avoid the time and cost of manufacturing and assembling different spill containers for different sizes of pipes and pipe nipples. Therefore, connection bodies such as those described herein may improve manufacturing and assembly of objects such as load line spill containers, for example.

Although specific embodiments have been described and illustrated, such embodiments should be considered illustrative only and not as limiting the invention as construed according to the accompanying claims.

The invention claimed is:

1. An apparatus connectable to objects of different sizes, the apparatus comprising:
  a first connection body comprising a first plurality of spaced-apart connectors and a second plurality of spaced-apart connectors spaced apart from the first plurality of spaced-apart connectors; and
  a second connection body comprising a first connector and a second connector spaced apart from the first connector of the second connection body, the first connector connectable to and disconnectable from a first one of the first plurality of spaced-apart connectors, and the second connector connectable to and disconnectable from a first one of the second plurality of spaced-apart connectors, wherein when the first connector is connected to the first one of the first plurality of spaced-apart connectors and when the second connector is connected to the first one of the second plurality of spaced-apart connectors, the first connection body and the second connection body define a region having a first size between the first connection body and the second connection body.

2. The apparatus of claim 1 further comprising a first cover body defining an opening sized to receive an object sized to be clamped in the first region.

3. The apparatus of claim 1 wherein the first size of the region is sized to clamp a generally cylindrical object having a first diameter.

4. The apparatus of claim 1 wherein the first plurality of spaced-apart connectors are spaced apart from each other in a first plane.

5. The apparatus of claim 4 wherein the second plurality of spaced-apart connectors are spaced apart from each other in a second plane extending non-parallel to the first plane.

6. The apparatus of claim 5 wherein the second plane extends generally perpendicular to the first plane.

7. The apparatus of claim 1 further comprising a third connection body comprising a third connector and a fourth connector spaced apart from the third connector of the third connection body, the third connector connectable to and disconnectable from a second one of the first plurality of spaced-apart connectors different from the first one of the first plurality of spaced-apart connectors, and the fourth connector connectable to and disconnectable from a second one of the second plurality of spaced-apart connectors different from the first one of the second plurality of spaced-apart connectors, wherein when the third connector is connected to the second one of the first plurality of spaced-apart connectors and when the fourth connector is connected to the second one of the second plurality of spaced-apart connectors, the first connection body and the third connection body are positioned to define a region having a second size, different from the first size, between the first connection body and the third connection body.

8. The apparatus of claim 7 wherein the first and second connectors are spaced apart from each other by a first separation distance, and wherein the third and fourth connectors are spaced apart from each other by a second separation distance different from the first separation distance.

9. The apparatus of claim 7 further comprising a second cover body defining an opening sized to receive an object sized to be clamped in the second region.

10. The apparatus of claim 7 wherein the second size of the region is sized to clamp a generally cylindrical object having a second diameter.

11. The apparatus of any one of claim 7 further comprising a fourth connection body comprising a fifth connector and a sixth connector spaced apart from the fifth connector of the fourth connection body, the fifth connector connectable to and disconnectable from a third one of the first plurality of spaced-apart connectors different from the first and second ones of the first plurality of spaced-apart connectors, and the sixth connector connectable to and disconnectable from a third one of the second plurality of spaced-apart connectors different from the first and second ones of the second plurality of spaced-apart connectors, wherein when the fifth connector is connected to the third one of the first plurality of spaced-apart connectors and when the sixth connector is connected to the third one of the second plurality of spaced-apart connectors, the first connection body and the fourth connection body are positioned to define a region having a third size, different from the first and second sizes, between the first connection body and the fourth connection body.

12. A spill container comprising:
a container body; and
an apparatus connectable to objects of different sizes, the apparatus comprising:
a first connection body connected to the container body and comprising a first plurality of spaced-apart connectors and a second plurality of spaced-apart connectors spaced apart from the first plurality of spaced-apart connectors; and
a second connection body comprising a first connector and a second connector spaced apart from the first connector of the second connection body, the first connector connectable to and disconnectable from a first one of the first plurality of spaced-apart connectors, and the second connector connectable to and disconnectable from a first one of the second plurality of spaced-apart connectors, wherein when the first connector is connected to the first one of the first plurality of spaced-apart connectors and when the second connector is connected to the first one of the second plurality of spaced-apart connectors, the first connection body and the second connection body define a region having a first size between the first connection body and the second connection body.

13. The spill container of claim 12 further comprising a pipe or a pipe nipple connected to the apparatus.

14. A method of connecting a first connection body and a second connection body to an object, the method comprising:

connecting a first connector of the second connection body to one of a first plurality of spaced-apart connectors on the first connection body; and
connecting a second connector of the second connection body, spaced apart from the first connector of the second connection body, to one of a second plurality of spaced-apart connectors on the first connection body and spaced apart from the first plurality of spaced-apart connectors,
wherein connecting the second connector of the second connection body to the one of the second plurality of spaced-apart connectors on the first connection body comprises defining a region between the first connection body and the second connection body to receive the object.

15. The method of claim 14 wherein defining the region between the first connection body and the second connection body comprises clamping the object between the first connection body and the second connection body.

16. The method of claim 14 wherein the object comprises a pipe or a pipe nipple.

17. The method of claim 14 wherein defining the region between the first connection body and the second connection body comprises connecting the object to a spill container.

18. The method of claim 14 wherein the first plurality of spaced-apart connectors are spaced apart from each other in a first plane.

19. The method of claim 18 wherein the second plurality of spaced-apart connectors are spaced apart from each other in a second plane extending non-parallel to the first plane.

20. The method of claim 19 wherein the second plane extends generally perpendicular to the first plane.

* * * * *